(12) United States Patent
Beck

(10) Patent No.: US 6,276,761 B1
(45) Date of Patent: Aug. 21, 2001

(54) VEHICLE BRAKING SYSTEM AND METHOD OF OPERATION THEREOF

(75) Inventor: Andrew Howard Beck, Huddersfield (GB)

(73) Assignee: Wabco Automotive UK Limited, Leeds (GB)

( * ) Notice: Subject to any disclaimer, the term of this patent is extended or adjusted under 35 U.S.C. 154(b) by 0 days.

(21) Appl. No.: 09/403,444

(22) PCT Filed: Apr. 23, 1998

(86) PCT No.: PCT/GB98/01187

§ 371 Date: Oct. 21, 1999

§ 102(e) Date: Oct. 21, 1999

(87) PCT Pub. No.: WO98/47751

PCT Pub. Date: Oct. 29, 1998

(30) Foreign Application Priority Data

Apr. 23, 1997 (GB) .................................................. 9708170

(51) Int. Cl.⁷ ..................................................... B60T 13/00
(52) U.S. Cl. .............................. 303/9.61; 303/127; 303/8; 303/9.66
(58) Field of Search .................................... 303/7, 8, 9.61, 303/9.66, 127; 280/432, 243, 428, 124.58, 124.16

(56) References Cited

U.S. PATENT DOCUMENTS 5,678,900   10/1997   Blanz .
6,089,831 * 7/2000   Bruchamann ............................. 303/3

FOREIGN PATENT DOCUMENTS

| 195 15 895 | 10/1996 | (DE) . |
| 196 32 754 | 2/1998 | (DE) . |
| 463 329 | 1/1992 | (EP) . |
| 0 689 117 | 12/1995 | (EP) . |
| WO96/34785 * | 11/1996 | (WO) ..................................... 303/3 |

* cited by examiner

Primary Examiner—Robert J. Oberleitner
Assistant Examiner—Devon Kramer
(74) Attorney, Agent, or Firm—Stroock & Stroock & Lavan LLP

(57) ABSTRACT

An air braking system of a vehicle has a compressor, non-return valve, manifold, electrically actuable demand valve, an air consumer circuit. An auxiliary circuit connects the manifold to the consumer circuit via an electrically actuable valve and non-return valve. In the event of electrical failure air under pressure can be supplied to the consumer circuit via the auxiliary circuit.

In another aspect a plurality of consumer circuits are provided. These circuits may be charged from the compressor via the manifold, or interconnected via the manifold independently of the compressor.

This arrangement permits more flexible compressor operation and/or a greater reserve in the event of failure of the pressure source.

8 Claims, 1 Drawing Sheet

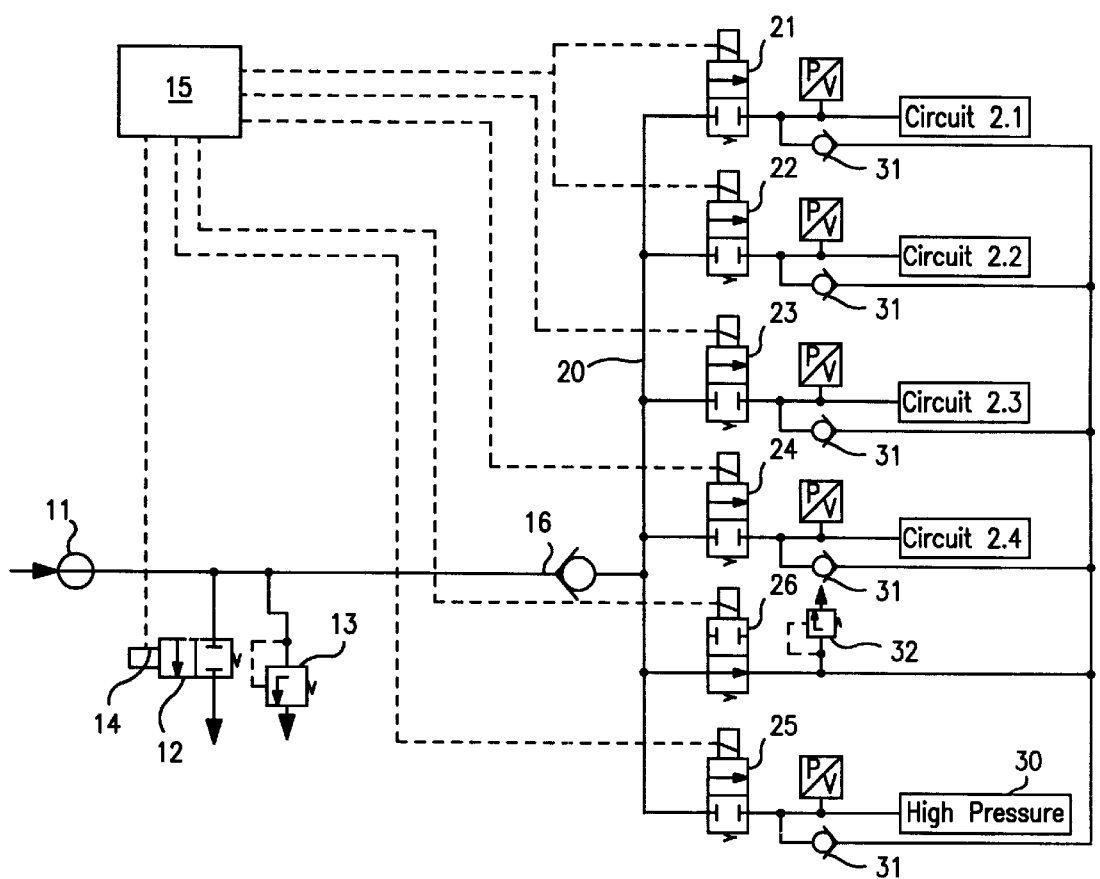

VEHICLE BRAKING SYSTEM AND METHOD OF OPERATION THEREOF

BACKGROUND OF THE INVENTION

The present invention concerns a vehicle braking system, and particularly an air braking system of the kind used on commercial vehicles.

Light vehicles such as cars and vans use dual circuit hydraulic braking systems, often with servo assistance. Heavier vehicles such as trucks and buses often use air braking systems in which air under pressure is the working medium.

A typical air braking system will include an air compressor, an air reservoir, a distribution valve, two service brake circuits and a handbrake circuit. Other components such as an air dryer and oil filter may be provided to ensure that the air supplied is at a desired quality. In addition to the usual three braking circuits air may also be supplied to a low pressure auxiliaries circuit where it is used for example for gear shift assistance or drivers seat adjustment. A high pressure auxiliary circuit may be provided, for example for vehicle air suspension control.

The distribution of air under pressure between the respective circuits is highly complex. As a priority air must be supplied to the brake circuits, but for example it is undesirable for a handbrake circuit to permit release of the handbrake whilst air pressure in the service brake circuits is low. The braking system must have carefully designed distribution arrangements to ensure that an air leak in one circuit does not result in loss of air pressure in all circuits; these arrangements may be very complex in order to give effective braking under all likely failure conditions. The air compressor must be large enough to meet all reasonable needs, but not to be so large that power consumption is unnecessarily high. The components of the braking system are preferably designed to meet the alternative legislative requirements which may be in force in different countries. For example legislation may limit the maximum usable pressure in some circuits but not in others. Finally the cost of the braking system must be maintained at a reasonable level for competitive reasons.

A conventional air braking system usually includes a rather complicated valve block which houses numerous valves, restrictors and other fluid components, the purpose of which is to direct air from the compressor to the air consumer circuits in the desired manner. Each valve block is designed for a particular vehicle installation and, once manufactured, is not susceptible of modification or adaptation. The danger of contamination is such that tampering or repair is discouraged. The manufacturing tolerances of a valve block must be very precisely controlled in order to ensure that the braking system operates correctly. The requirement for close tolerances leads to a consequential increase in manufacturing cost, and the potential for a high scrap cost if a mistake is made in the manufacturing process.

In order to reduce costs it would be desirable to reduce the number of different valve blocks. Furthermore it would be desirable to be able to adapt a valve block to generally different circumstances of use without requiring a re-design of the fluid components therein. It would also be useful to be able to tune a valve block to the precise circumstances of a particular vehicle application.

BRIEF SUMMARY OF THE INVENTION

According to a first aspect of the invention there is provided an air braking system of a vehicle comprising a compressor, an air consumer circuit, a first electrically actuable valve between said compressor and said consumer circuit, an auxiliary air circuit, and a second electrically actuable valve between said compressor and said auxiliary circuit, wherein said auxiliary circuit is connected to said consumer circuit via a non-return valve.

In use said first and second valves are normally maintained closed and said first valve is opened according to the demand of said consumer circuit. In the event of an electrical failure of said first valve, the auxiliary circuit can be arranged to supply said consumer circuit via the second valve and the non-return valve. The non-return valve ensures that the consumer circuit does not feed the auxiliary circuit.

The system preferably includes a plurality of consumer circuits each supplied via a respective electrically actuable valve, and each having a connection to the auxiliary circuit via a respective non-return valve. Thus a failure of any of the electrically actuable valves supplying a consumer circuit can be overcome, as least partly by supplying air under pressure from the auxiliary circuit.

In a preferred embodiment the consumer circuit is supplied by a valve normally biased closed by resilient means, whereas the valve supplying the auxiliary circuit is normally biased open by resilient means. Thus an electrical failure ensures that fluid pressure is available to the consumer circuit via the auxiliary circuit. In normal operation however the valve supplying the auxiliary circuit is energized, and thus closed.

The auxiliary circuit may include a pressure relief valve.

According to a second aspect, the invention provides a method of operating the air braking system according to the first aspect of the invention, the method comprising the steps of 1) maintaining said first and second valves closed,
2) opening said first valve on demand to supply said consumer circuit, and
3) in the event of an electrical failure, causing said second valve to open, thereby to supply air under pressure to said consumer circuit via said auxiliary circuit.

According to a third aspect of the invention there is provided an air braking system of a vehicle, the system comprising a compressor, a distribution manifold, a non-return valve between said manifold and said compressor, a first air circuit, a second air circuit, a first electrically actuable valve between said manifold and said first air circuit, a second electrically actuable valve between said manifold and said second air circuit, sensor means to determine the condition of said first and second air circuits and logic means responsive to said sensor means to open and close said solenoid valves to permit charging of said circuits from said compressor and connection of said circuits via said manifold.

Such a braking system can eliminate the usual valve block and admit air to a respective air circuit according to pre-programmed logic. A standard distribution valve may include two or more full flow electrically actuable valves, and be suitable for use on many kinds of vehicle according to programming of the logic means. An alternative logic means can change the operating characteristics of the system without requiring modification of the distribution valves themselves. Lengthy re-design and testing for different vehicle specifications is obviated. Cost is substantially reduced due to standardization, and the individual valves may be replaceable as discrete units without compromising overall system safety.

The logic means may include a programmable element to permit the logic to be changed or tuned to meet specific needs of an air braking system. The electrically operable valve may be a solenoid valve.

The non-return valve between the compressor and the consumer circuits permits air under pressure in one circuit to be fed to another circuit independently of the compressor. In this way air under pressure in an auxiliaries circuit could be directed to a service brake circuit so as to give a greater safety reservoir in the event of compressor failure, or to permit more efficient use of the compressor in normal operation.

Thus there is the possibility that the usual service brake reservoir can be reduced in size because a reservoir of an auxiliaries circuit can be made available to supplement the service brake reservoir. Alternatively the compressor itself may have a reduced output during normal vehicle operation owing to the reservoirs of all of the independent circuits being available to supplement the reservoir of one or two circuits. Numerous possibilities for diverting air between air circuits exist, leading to the possibility of a reduction in compressor size and/or greater efficiency in the use of compressor output.

In normal circumstances of brake circuit operation, the braking circuits are charged and isolated from the compressor; in the present invention the equivalent electrically actuable valves are normally closed, and open on electrical command to permit the flow of air under pressure to charge the respective circuits. In a preferred embodiment of the invention, a normally open electrically actuable valve permits fluid connection from the compressor to the downstream side of one or more of the normally closed valves. In use, the normally open valve is closed on electrical command, and pressure downstream of the normally closed valves is determined by the opening and closing of the normally closed valves under electrical command.

If the electrical system should fail, the normally closed valves will stay closed, and consequently will not admit air to the braking circuits. However the normally open valve will revert from the closed to the open state and permit air under pressure to reach one or more desired circuits by passing the other electrically actuable valves. In this way a degree of failsafe operation can be introduced into the braking system.

The manner in which air is supplied through the normally open valve in the event of an electrical failure is dependent on the system parameters and legal requirements. The arrangement will comprise a suitable back-up system to ensure that air is used effectively; what is important is that a source of air is available for use in the event of a failure of the electrical control system.

According to a fourth aspect of the invention, there is provided a method of operation of an air braking system according to the third aspect of the invention, the method comprising the steps of 1) supplying air under pressure from said compressor to said manifold;

2) opening and closing said valves to supply air from said manifold to said consumer circuits on demand; and 3) under predetermined conditions, energizing said valves so as to connect said circuits via said manifold.

In this way a compressor failure or air leak upstream of said manifold does not render the air consumer circuits solely reliant on their Individual reservoir volumes. Air under pressure from a secondary consumer circuit can be directed to a primary circuit, and thus give a greater operational reserve. Furthermore in the case of a fully functioning system air may be preferentially diverted via said manifold to an air consumer rather than bringing said compressor on load. Such an arrangement may be particularly useful in avoiding repeated operation of the compressor for short periods.

Other features of the invention will be apparent from the following description of a preferred embodiment illustrated by way of example only in the accompanying drawing which is a schematic representation of a system according to the present invention.

BRIEF DESCRIPTION OF THE DRAWING

The accompanying FIGURE is a schematic representation of a system according to the present invention.

In the accompanying drawing, a compressor 11 supplies air under pressure to a fluid circuit of a vehicle. The supply line includes the usual unloader valve 12 and high pressure relief valve 13. The unloader valve is moved by an electrical solenoid 14 according to command signals from an electronic processing unit 15, and connects the compressor output to exhaust when air under pressure is not required. Other arrangements for taking the compressor off load, or stopping the compressor are well known, and suitable for use with this invention.

Air pressure connections are shown as solid lines whereas electrical command connections are shown as dotted lines.

Compressor output is connected via the usual reservoir and air dryer (not shown), and non-return valve 16 to six solenoid operated valves 21–26, which are illustrated in their normal (inactivated) state. Five of the valves 21–25 are normally closed whereas one valve 26 is normally open. Electrical command connections link the respective solenoids to the processing unit 15, as illustrated. The valves 21–26 may be grouped together and fed by a common manifold 20. The processing unit 15 receives inputs (not shown) indicative of system parameters such as pressure, and causes the solenoid valves to be energized and de-energized in a manner to be described.

Each of the normally closed valves is connected to an air consumer. Thus valves 21 and 22 are connected to service brake circuits 2.1 and 2.2; valve 23 is connected to parking brake circuit 2.3; valve 24 is connected to low pressure auxiliaries circuit 2.4, and valve 25 is connected to a high pressure auxiliaries circuit 30. Each consumer circuit may include a reservoir, a demand valve and one or more actuators. For example the service brake circuits 2.1 and 2.2 will include reservoirs, a foot valve and a plurality of wheel brake actuators.

The consumer circuits are connected downstream of the respective valve 21–25, and via a respective non-return valve 31 to the downstream side of the normally open valve 26. A low pressure relief valve 32 is connected on the downstream side of valve 26.

Details of the air consumers and their respective fluid circuits are not shown, and are conventional.

The accompanying drawing illustrates the solenoid valves 12 and 21–25 in their normal spring biased condition with no electrical signal applied to the respective solenoids.

In use the compressor allows pressure upstream of the solenoid valve to rise to a level dictated by the unloader valve 12. The high pressure relief valve relieves pressure in the event of a failure of the unloader valve 12, and may be set at for example 12–14 bar. The compressor will usually have a short life if working continuously at such high pressures.

The solenoid valve 26 is energized at all times during normal system operation to close the fluid path therethrough.

The solenoid valves 21–25 are unenergized, and normally closed. Accordingly during normal operation in the state where the air consumers have no demand all of the solenoid valves 21–26 are closed.

Alternatively the solenoid valve 26 could be unenergized at times when the compressor is off load, and valve 12 consequently open. As the compressor comes on load, the valve 26 would be energized.

Should the processing unit 15 sense a demand in any of the consumer circuits (due for example to low reservoir pressure), the respective solenoid valves 21–25 will be opened to allow that demand to be met by the compressor, valve 26 being closed.

Owing to the fact that the compressor 11 is isolated from manifold 20 by non-return valve 16, the system logic can alternatively supply air from one consumer circuit to another consumer circuit by opening respective solenoid valves 21–25.

For example the system logic may choose to charge a depleted low pressure auxiliaries circuit 2.4 from the high pressure auxiliaries circuit 30, rather than place the compressor on load for a short period. The interconnecting manifold 20 isolated by non-return valve 16, makes this possible, and can ensure that the compressor does not run repeatedly for short periods.

In the event of a failure of the fluid circuit downstream of a respective solenoid valve 21–26, the processing unit 15 will isolate that circuit by closing the respective valve of the affected circuit, or by maintaining the respective valve in the closed state. The processing unit will be programmed with information concerning the normal operating states of the circuits, and thus be able to detect a malfunction from changes in the input signals; the pre-programmed information will usually correspond at least to the operating sequence of a conventional distribution valve. In this way the processing unit ensures that failure of one circuit does not affect all circuits.

A failure of the circuit upstream of the non-return valve 16, for example a compressor fault, will result in a drop in pressure which will be detected by the processing unit 15. As a result the solenoid valves 21–26 will be closed or maintained closed to retain downstream pressure.

An air dryer having a restricted back flow is usually immediately downstream of the unloader valve, and accordingly closure of the non-return valve 16 may not be sufficient to isolate the downstream circuit.

The processing unit 15 will be aware of such failure from the normal sensor inputs, and be programmed to use available pressure downstream of valve 16 in the most appropriate manner. For example, air under pressure in circuit 30 could be fed back into the manifold 20 by opening solenoid valve 25, and thereby provide an extra reserve for the service brake circuits 2.1 and 2.2. The processing unit can be pre-programmed to cause the solenoid valves to open and close in any desired pattern according to failure type, vehicle load, legislative requirements and the like. A major advantage of the invention is that re-programming of the processing unit is all that is required to change the response of the system, and this can be effected by a substitute ROM or other electronic means; the arrangements of solenoid valves 21–26 does not require any change. The use of air from one consumer circuit in any other consumer circuit is not possible with conventional distribution valves because of the inherent complexity and expense.

Accordingly one set of solenoid valves can serve in any installation, and the control logic easily altered to suit operational parameters. This in turn means that the response of the braking system can be finely tuned to other factors such as laden/unladen weight in a manner which is not possible with conventional valve blocks.

In the event of a failure of the electrical system, all solenoids will revert to their normal inactivated state. System pressure is determined by relief valve 32. Solenoids valves 21–25 are closed, but solenoid valve 26 is open thus allowing air under pressure to be fed through the respective non-return valves 31 to the consumer circuits.

In this way air under pressure continues to be available to any or all of the consumer circuits, and braking of the vehicle is assured.

It will be understood that the relief valve 32 may be set to a lower working pressure than that normally available in some of the consumer circuits. Thus in the event of an electrical failure, the pressure available in the service brake circuits 2.1, 2.2 via valve 26 and non-return valves 31 may be less than normal, but still adequate to meet legislative requirements. The driver will be warned of a failure by the usual warning lamp, and thus be aware that braking at maximum efficiency may not be available.

In the event of a complete electrical failure the compressor will be arranged to run continuously, and thus air under pressure is supplied to the consumers via solenoid valve 26. This ensures that the vehicle is able to reach its destination, or a suitable repair facility.

A continuously running compressor has a shorter life than one which generally operates intermittently. Advantageously the relief valve 32 is set at a pressure lower than that of some consumer circuits, but still at a level adequate to meet legislative requirements for e.g. the service brake. In this way the life of the compressor can be extended in the event of a system failure, and the specification of the compressor can be lower than if continuous running at high load is required.

In the event of failure of a single solenoid valve 21–25, the consumer circuit associated with that valve can be fed via valve 26 and a respective non-return valve 31. In this way an isolated electrical failure does not result in complete loss of effectiveness of the consumer circuit.

In a further refinement a fluid restrictor (not shown) could be provided to bypass a non-return valve 31. In this way particular consumer circuits would be permitted to bleed down to the same level when the vehicle engine is turned off. Such an arrangement may be useful where it is desired to prevent release of a handbrake (circuit 2.3) in cases where insufficient service brake pressure is available.

A further advantage of the invention allows rapid build-up of service brake pressure from rest in cases where pressure in the service brake circuits has decayed. Energization of e.g. solenoid valve 25 may permit an initial charge of air under pressure into manifold 20, and thus reduce the time for the compressor to increase service brake pressure to an acceptable level.

Naturally, the use of individual solenoid valves 21–25 permits the consumer circuits to be charged in a preferential order, according to operational requirements.

The control logic may be altered in any suitable manner, for example by a replacement ROM, and may be adapted to real time or self learning modification.

What is claimed is:

1. An air braking system of a vehicle comprising a compressor, an air consumer circuit, a first electrically actuable valve between said compressor and said consumer circuit, an auxiliary air circuit, and a second electrically actuable valve between said compressor and said auxiliary circuit, wherein said first electrically actuable valve is of the normally closed type, and said second electrically actuable valve is of the normally open type, and said auxiliary circuit is connected for supply to said consumer circuit downstream of said first electrically actuable valve via a non-return valve.

2. A system according to claim 1 wherein said auxiliary circuit includes a pressure relief valve downstream of said second electrically actuable valve.

3. A system according to claim 2 wherein the relief pressure in said auxiliary circuit is lower than the relief pressure in said consumer circuit.

4. A system according to any claim 1 and further including a plurality of consumer circuits each supplied via a respective electrically actuable valve, and each having a connection from the auxiliary circuit via a respective non-return valve.

5. A system according to claim 4 and further including an inlet non-return valve downstream of said compressor, a distribution manifold downstream of said inlet non-return valve and upstream of said electrically actuable valves, sensor means to determine the condition of first and second air consumer circuits and logic means responsive to said sensor means to open and close said electrically actuable valves to permit charging of said circuits from said compressor and connection of said circuits via said manifold.

6. A method of operating an air braking system of a vehicle, comprising the steps of:

1) providing the air braking system, the air braking system having a compressor, an air consumer circuit, a first electrically actuable valve between said compressor and said consumer circuit, an auxiliary air circuit, and a second electrically actuable valve between said compressor and said auxiliary circuit, wherein said first electrically actuable valve is of the normally closed type, and said second electrically actuable valve is of the normally open type, and said auxiliary circuit is connected for supply to said consumer circuit downstream of said first electrically actuable valve via a non-return valve;

2) maintaining said first and second valves closed, 3) opening said first valve on demand to supply said consumer circuit, and 4) in the event of an electrical failure, causing said second valve to open, thereby to supply air under pressure to said consumer circuit via said auxiliary circuit.

7. A method of operating an air braking system according to claim 6, the method comprising the steps of:

1) supplying air under pressure from said compressor to a manifold;

2) opening and closing said valves to supply air from said manifold to said consumer circuits on demand; and 3) under predetermined conditions, energizing said valves so as to connect said circuits via said manifold and permit air under pressure to flow from one of said circuits to the other of said circuits via said manifold.

8. A method according to claim 7 wherein said valves are selectively energized to connect said circuits via said manifold in the event of the absence of said air supply.

* * * * *